(12) United States Patent
Cordeiro et al.

(10) Patent No.: US 10,939,445 B2
(45) Date of Patent: Mar. 2, 2021

(54) METHODS AND APPARATUS TO ANNOUNCE CHANNEL CAPABILITIES IN WIRELESS COMMUNICATION SYSTEMS

(71) Applicant: Intel IP Corporation, Santa Clara, CA (US)

(72) Inventors: Carlos Cordeiro, Portland, OR (US); Solomon Trainin, Haifa (IL); Ou Yang, Santa Clara, CA (US)

(73) Assignee: INTEL IP CORPORATION, Palo Alto, CA (US)

( * ) Notice: Subject to any disclaimer, the term of this patent is extended or adjusted under 35 U.S.C. 154(b) by 0 days.

(21) Appl. No.: 15/476,418

(22) Filed: Mar. 31, 2017

(65) Prior Publication Data
US 2018/0288758 A1   Oct. 4, 2018

(51) Int. Cl.
  *H04W 72/04* (2009.01)
  *H04W 72/02* (2009.01)
  *H04W 48/14* (2009.01)
  *H04W 48/16* (2009.01)
  *H04W 84/12* (2009.01)

(52) U.S. Cl.
  CPC ........ *H04W 72/048* (2013.01); *H04W 48/14* (2013.01); *H04W 72/02* (2013.01); *H04W 48/16* (2013.01); *H04W 84/12* (2013.01)

(58) Field of Classification Search
  CPC .......................... H04L 1/0003; H04L 1/0009
  See application file for complete search history.

(56) References Cited

U.S. PATENT DOCUMENTS

| | | | | |
|---|---|---|---|---|
| 2013/0231150 A1* | 9/2013 | Bang | ..................... | H04W 72/08 455/509 |
| 2014/0141826 A1* | 5/2014 | Cordeiro | .................. | H04L 67/16 455/509 |
| 2014/0206406 A1* | 7/2014 | Cordeiro | ............. | H04W 72/046 455/501 |
| 2015/0282032 A1* | 10/2015 | Gupta | ................... | H04W 76/10 370/237 |
| 2016/0007277 A1* | 1/2016 | Li | ..................... | H04W 72/0453 370/329 |
| 2016/0198350 A1* | 7/2016 | Lou | ...................... | H04B 17/345 370/252 |
| 2016/0380685 A1* | 12/2016 | Kasher | .................... | H04W 8/22 370/329 |
| 2017/0111099 A1* | 4/2017 | Jo | .......................... | H04B 7/063 |
| 2017/0302349 A1* | 10/2017 | Sun | ....................... | H04B 7/088 |
| 2018/0019898 A1* | 1/2018 | Takahashi | ........... | H04W 72/048 |
| 2018/0069683 A1* | 3/2018 | Huang | .................. | H04L 5/0092 |
| 2018/0206143 A1* | 7/2018 | Patil | ..................... | H04L 1/1628 |
| 2018/0206284 A1* | 7/2018 | Zhou | ..................... | H04L 1/1621 |

* cited by examiner

*Primary Examiner* — Zhiren Qin
(74) *Attorney, Agent, or Firm* — Hanley, Flight & Zimmerman, LLC

(57) ABSTRACT

Methods and apparatus to announce channel capabilities in wireless communication systems are discussed herein. An example first wireless communication device includes a channel support identifier to determine wireless communication channels supported by the wireless communication device, a channel capability field generator to generate a listing of the supported wireless communication channels, a channel capability field inserter to insert the listing into a Capabilities element transmitted to a second wireless communication device.

20 Claims, 8 Drawing Sheets

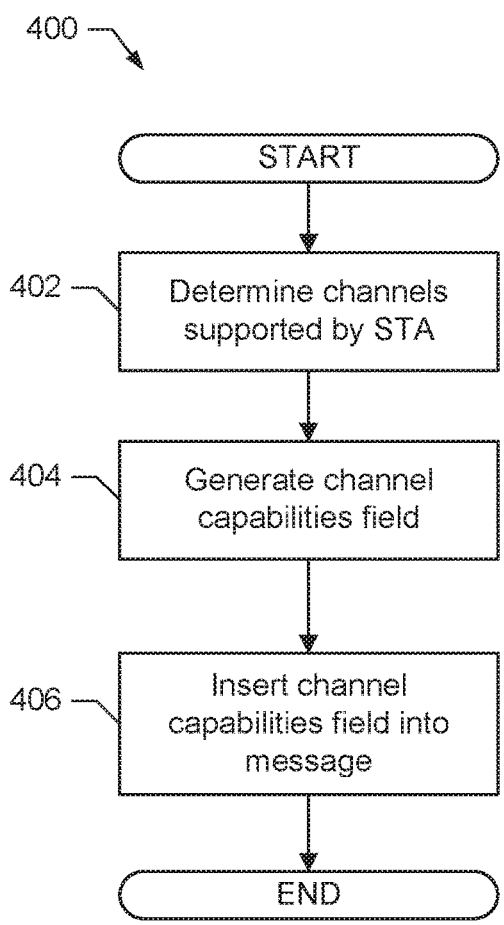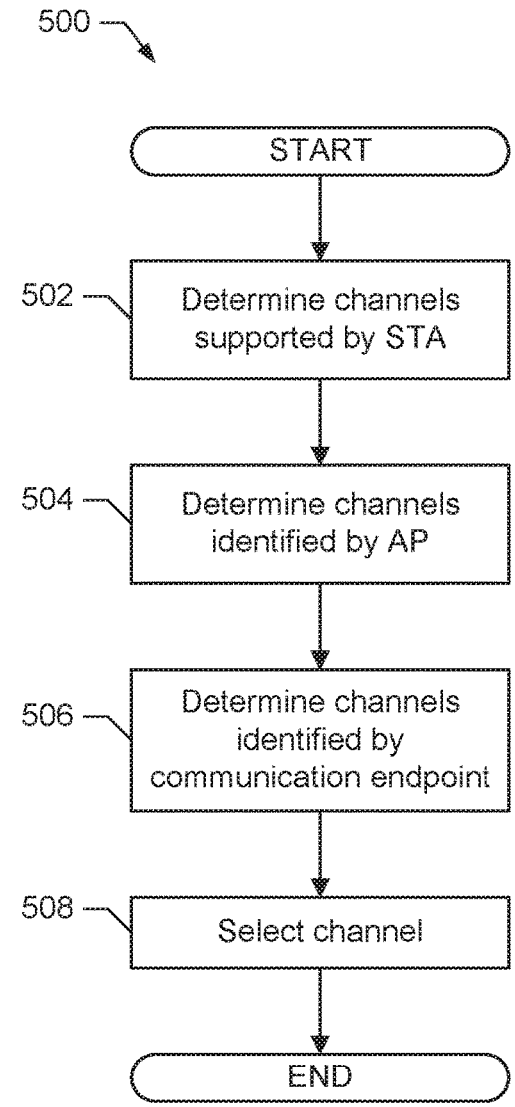
FIG. 4
FIG. 5

METHODS AND APPARATUS TO ANNOUNCE CHANNEL CAPABILITIES IN WIRELESS COMMUNICATION SYSTEMS

FIELD OF THE DISCLOSURE

This disclosure relates generally to wireless communication, and, more particularly, to methods and apparatus to announce channel capabilities in wireless communication systems.

BACKGROUND

Wireless communication systems may support communication on multiple channels. For example, according to the Institute of Electrical and Electronics Engineers (IEEE) standard 802.11ay (IEEE draft std. 802.11ay, published January 2017), the multiple channels (e.g., millimeter wave channels) available for communication may be bonded and/or aggregated to provide more bandwidth and/or more robust communications. These multiple channels may be utilized when communicating among devices of the same type (e.g., two stations (STA) communicating with each other) and/or when communication among devices of different types (e.g., a STA communicating with an access point (AP)).

BRIEF DESCRIPTION OF THE DRAWINGS

FIGS. 4-5 are flowcharts illustrating example machine readable instructions that may be executed to implement the station channel capabilities handler of FIGS. 1 and/or 2.

Wherever possible, the same reference numbers will be used throughout the drawing(s) and accompanying written description to refer to the same or like parts.

DETAILED DESCRIPTION

In view of the support of multiple channels in some wireless communication protocols, wireless devices (e.g., devices operating according to IEEE 802.11ay) would benefit from the ability to announce capabilities to support multiple channels for communication. Furthermore, in a given network, multiple devices may have different capabilities in supporting multiple channels. Currently, there is no ability for devices to announce these capabilities.

Methods and apparatus disclosed herein facilitate transmission of a channel capabilities element from a STA to announce channels supported by the STA. In some example the channels are millimeter wave wireless communication channels (e.g., millimeter wave channels in the 60 GHz frequency band according to the IEEE 802.11ay protocol). In some examples, the STA transmit the channel capabilities element in a capabilities element (e.g., an Extended Directional Multigigabit (EDMG) Capabilities element). Methods and apparatus disclosed herein also facilitate transmission of an operating channels field from a central network controller (e.g., an AP) to announce channels that are supported within an infrastructure. According to the illustrated examples, the channels announced by the AP may limit the channels used within the network or may only limit the channels utilized when communicating with the AP (e.g., channels not identified in the AP announcement may be utilized in communications among STAs).

As used within this document, the term "communicate" (and variations thereof) is intended to include transmitting and/or receiving. Similarly, the term "communicate" may refer to the bidirectional exchange of data between two devices (both devices transmit and receive during the exchange).

Figure 1:
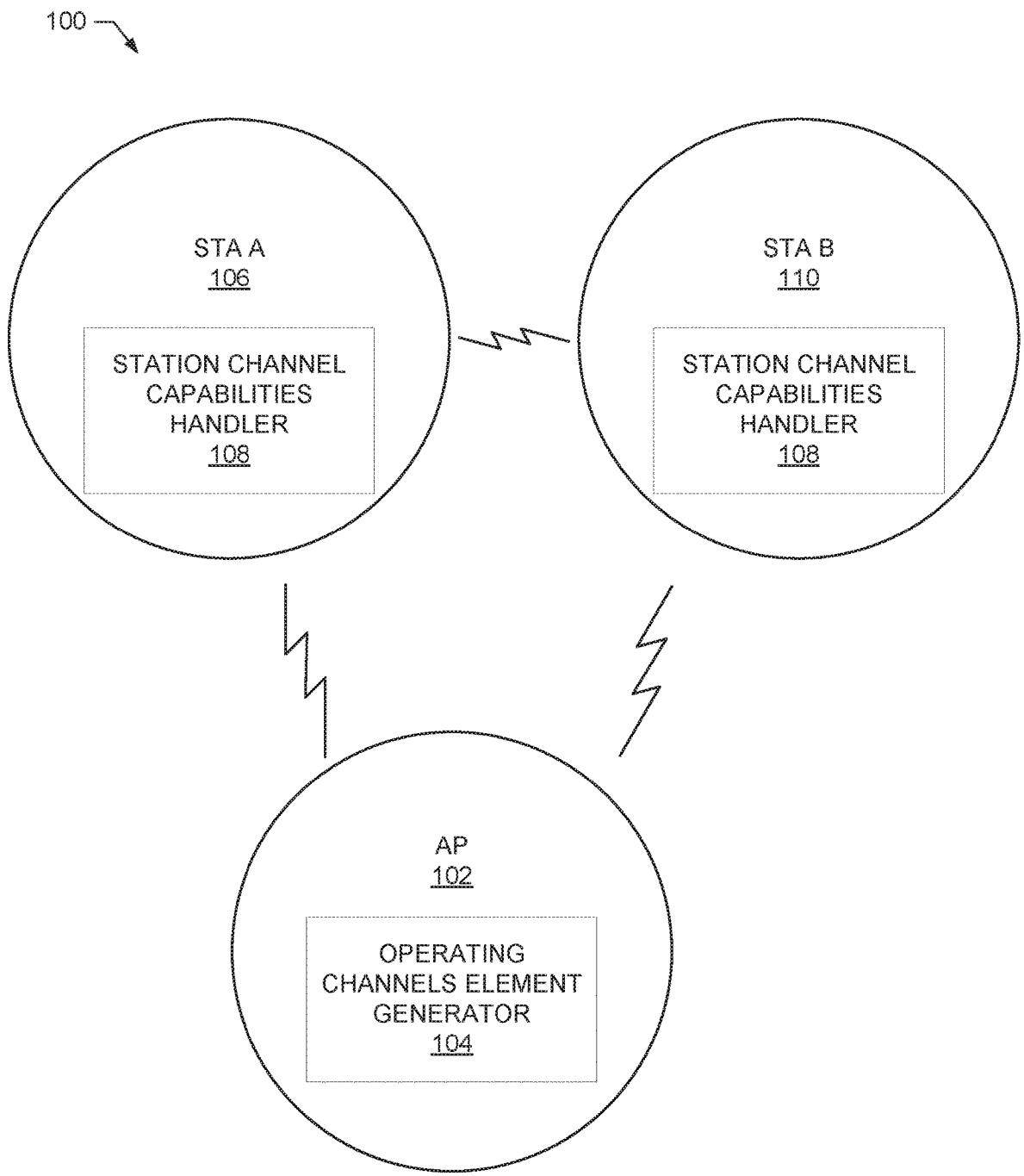
FIG. 1 is a block diagram of an example network.

FIG. 1 is a block diagram of an example network 100. The example network 100 includes an AP 102 that includes an example operating channels element generator 104. The example AP 102 is in communication with an example STA A 106 that includes an example station channel capabilities handler 108. The example AP 102 is also in communication with an example STA B 110 that includes the example station channel capabilities handler 108. According to the illustrated example, the STA A 106 is also in direct communication with the example STA B 110. While one AP and two STAs are included in the example network 100, the network 100 may include any number of APs and STAs.

The AP 102 of the illustrated example is a central device that communicates wireless with the STAs (e.g., STA A 106 and STA B 110) in the example network 100. In some examples, the AP 102 is a bridge to another network (e.g., a bridge to a wired network). The AP 102 may be any type of access point such as a base station, a primary basic service set (PBSS) control point (PCP), etc. According to the illustrated example, the AP 102 operates according to the IEEE 802.11ay protocol. Alternatively, the AP 102 may support any other protocols and any number of protocols.

The example operating channels element generator 104 of the illustrated example generates an element (e.g., field) to announce supported channel capabilities to other devices in communication with the AP 102 (e.g., the example STA A 106 and the example STA B 110). The element indicates to devices in the network which operating channels are allowed for communication. For example, the channels allowed for communication may be established by an administrator when a network 100 is deployed. Alternatively, the example AP 102 may survey devices in the network 100 to find a set of channel capabilities that are supported by all devices.

The example STA A 106 and the example STA B 110 are devices that support wireless communications. The example STA A 106 and the example STA B 110 may be any type of devices (e.g., mobile computing devices, desktop computing devices, mobile phones, televisions, network infrastructure devices, etc.). According to the illustrated example, the STA A 106 and the STA B 110 communicate with each other and independently communicate with the example AP 102. According to the illustrated example, the STA A 106 and the STA B 110 operate according to the IEEE 802.11ay protocol.

Alternatively, the STA A 106 and/or the STA B 110 may support any other protocols and any number of protocols.

The example station channel capabilities handler 108 of the illustrated example generates an element (e.g., field) to announce supported channel capabilities of a given STA to other devices in communication with the STA (e.g., the example STA A 106 and the example STA B 110).

Figure 2:
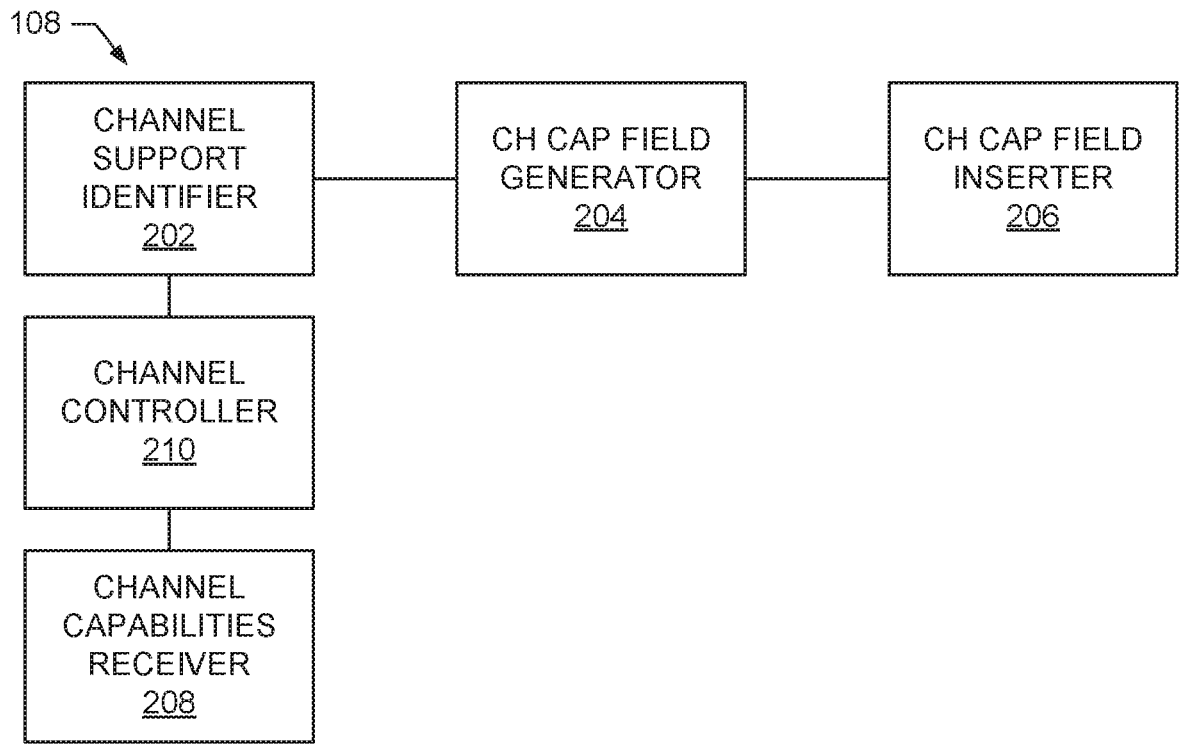
FIG. 2 is a block diagram of an example implementation of the station channel capabilities handler of FIG. 1.

FIG. 2 is a block diagram of an example implementation of the station channel capabilities handler 108 of FIG. 1. The example station channel capabilities handler 108 includes an example channel support identifier 202, an example channel capability field generator 204, an example channel capability field inserter 206, an example channel capabilities receiver 208, and an example channel controller 210.

The example channel support identifier 202 determines communication channels supported by an STA. For example, an indication of channels supported by an STA may be stored in memory of the STA and retrieved by the channel support identifier 202. According to the illustrated example, the indication of channel support is associated with unique channel numbers for single, bonded, and/or aggregated channels. The example STA A 106 and the example STA B 110 support some or all of 6 channels of 2.16 GHz, channel bonding of up to four 2.16 GHz channels, and channel aggregation of 2.16 GHz+2.16 GHz and 4.32 GHz+ 4.32 GHz. Alternatively, any other channels and channel combinations supported by a wireless protocol may be utilized by an STA and determined by the channel support identifier 202. The example channel support identifier 202 transmits identified channel support information to the example channel capability field generator 204 and the example channel controller 210.

Figure 7:
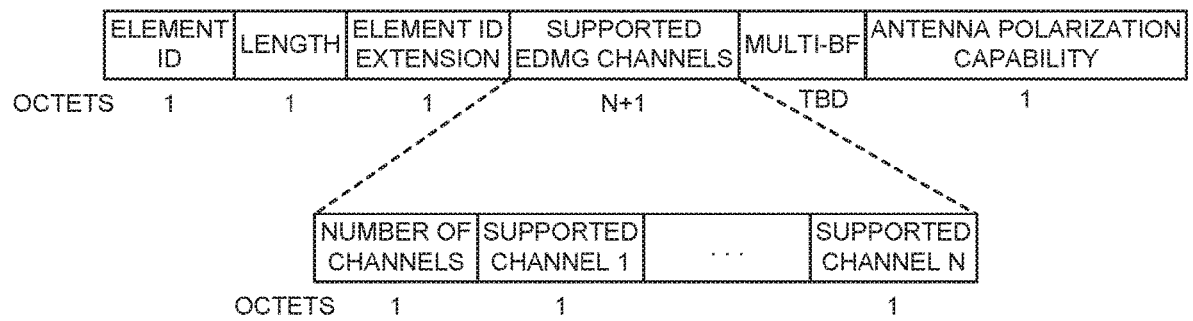
FIGS. 7-10 illustrate example elements that may be generated in accordance with the methods and apparatus disclosed herein.

The example channel capability field generator 204 of the illustrated example generates a message field indicating the channels supported by a STA. An example field is illustrated in FIG. 7. According to the illustrated example, the field includes an element (e.g., 1 octet) indicating the number of channels supported and, for each supported channel, an identification of the channel (e.g., N octets, where N is the number of supported channels). Alternatively, any other manner of identifying support may be utilized. Furthermore, the identification of channel support may be separated in multiple elements included in multiple messages. For example, an indication of support for channel capability identification (e.g., a single bit to indicate that the STA supports channel capability reporting) may be transmitted during a beacon to establish a connection (e.g., a low bit rate communication period). In such an example, once a connection is established with a more robust connection (e.g., a connection using beam forming that supports a higher bit rate communication), the indication of specific channel support may be transmitted.

The example channel capability field inserter 206 inserts the channel capability field generated by the example channel capability field generator 204 into a message. According to the illustrated example, as illustrated in FIG. 7, the channel capability field inserter 206 inserts the capability field into an EDMG Capabilities element. While an example location for the channel capability field in the EDMG Capabilities element is illustrated in FIG. 7, the channel capability field may be inserted in any other location within the EDMG capabilities element or another message.

The example channel capabilities receiver 208 of the illustrated example analyzes operation element messages received from the example AP 102 to determine channels supported by the infrastructure of the example network 100. In addition, the example channel capabilities receiver 208 analyzes channel capabilities messages received from other network devices (e.g., peer STAs). In some implementations, the channels supported by the infrastructure indicate (e.g., limit) the channels that may be used when communicating with the AP 102. In some other implementations, the channels supported by the infrastructure indicate that channels that may be used when communicating with any device within the example network 100.

The example channel controller 210 selects a channel(s) for communication based on the channels supported by the STA (e.g., as reported by the example channel support identifier 202) and the channels allowed for the infrastructure (e.g., allowed within the basic service set (BSS)) (e.g., as indicated by the example channel capabilities receiver 208). For example, the channel controller 210 may select a channel(s) that is indicated to be supported by the STA and allowed within the infrastructure. In some examples, example channel controller 210 may not consider the channel support indicated by the AP 102. For example, in systems in which individual STAs are allowed to communicate with each other using a channel(s) that is not allowed by the AP 102, the channel controller 210 may ignore the channels indicating in an operating element from the AP 102 and select channels based on the channels indicated by the channel support identifier 202 and channels supported by a device with which the communication is to be established.

While an example manner of implementing the station channel capabilities handler 108 of FIG. 1 is illustrated in FIG. 2, one or more of the elements, processes and/or devices illustrated in FIG. 2 may be combined, divided, re-arranged, omitted, eliminated and/or implemented in any other way. Further, the example channel support identifier 202, the example channel capability field generator 204, the example channel capability field inserter 206, the example cooperating element analyzer 108, the example channel controller 210 and/or, more generally, the example station channel capabilities handler 108 of FIG. 2 may be implemented by hardware, software, firmware and/or any combination of hardware, software and/or firmware. Thus, for example, any of the example channel support identifier 202, the example channel capability field generator 204, the example channel capability field inserter 206, the example cooperating element analyzer 108, the example channel controller 210 and/or, more generally, the example station channel capabilities handler 108 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, channel support identifier 202, the example channel capability field generator 204, the example channel capability field inserter 206, the example cooperating element analyzer 108, and/or the example channel controller 210 is/are hereby expressly defined to include a tangible computer readable storage device or storage disk such as a memory, a digital versatile disk (DVD), a compact disk (CD), a Blu-ray disk, etc. storing the software and/or firmware. Further still, the example the station channel capabilities handler 108 of FIG. 1 may include one or more elements, processes and/or devices in addition to, or instead of, those illustrated in FIG. 2, and/or may include more than one of any or all of the illustrated elements, processes and devices.

Figure 3:
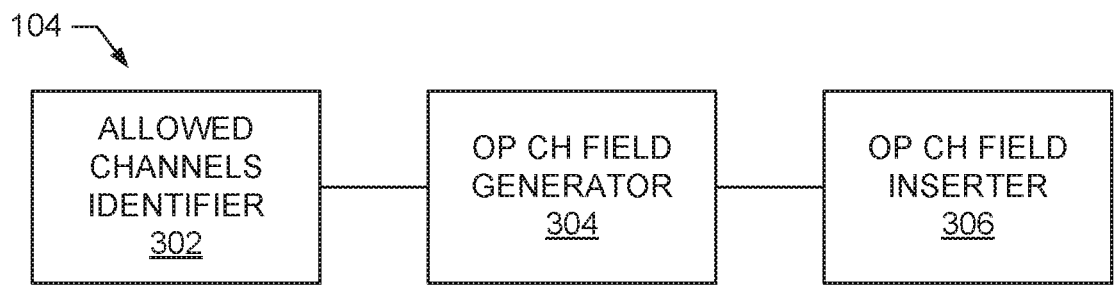
FIG. 3 is a block diagram of an example implementation of the example operating channels element generator of FIG. 1.

FIG. 3 is a block diagram of an example implementation of the example operating channels element generator 104 of FIG. 1. The example operating channels element generator 104 of FIG. 3 includes an example allowed channels identifier 302, an example operating channel field generator 304, and an example operating channel field inserter 306.

The example allowed channels identifier 302 determines communication channels supported for the infrastructure associated with the example AP 102 of FIG. 1. For example, the communication channels supported may be established during deployment of the AP 102, during deployment of the network 100, etc. Alternatively, the AP 102 may learn of supported channels by identifying channels that are mutually supported by devices connected to the example network 100. The example allowed channels identifier transmits the allowed channels to the example operating channel field generator 304.

Figure 8:
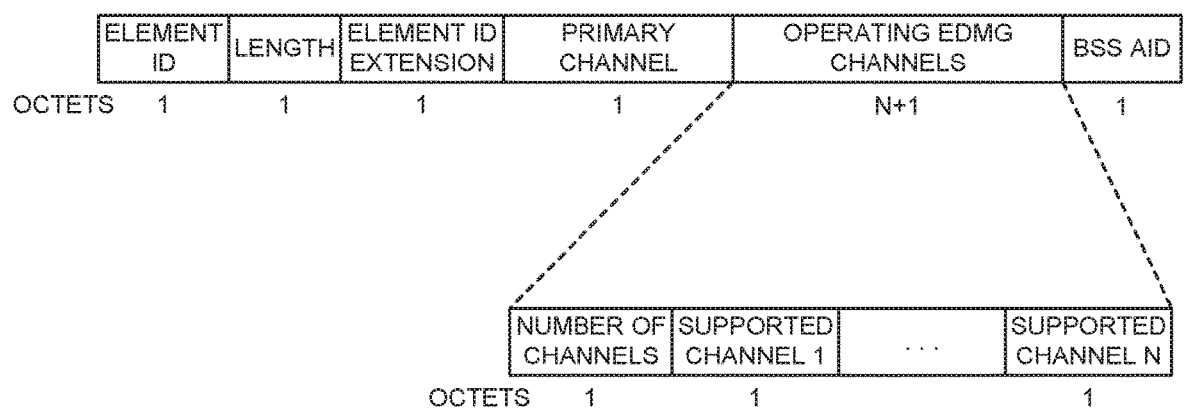
Figure 9:
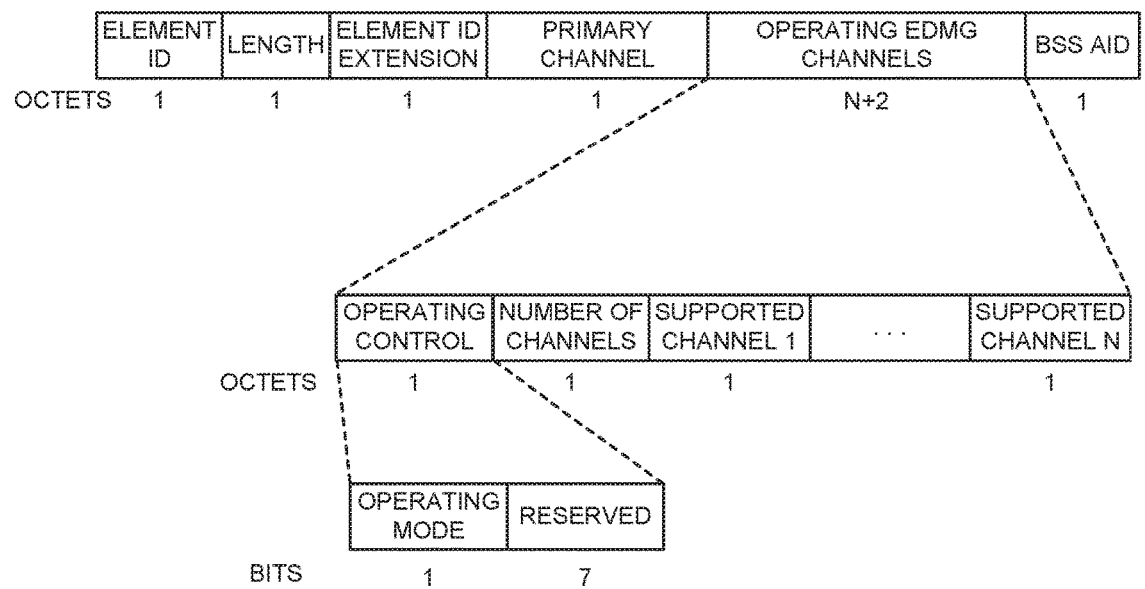

The example operating channel field generator 304 of the illustrated example generates a message field indicating the channels supported/allowed in the infrastructure. Example fields are illustrated in FIGS. 8 and 9. According to the illustrated example, the field includes an element (e.g., 1 octet) indicating the number of channels supported/allowed and, for each supported/allowed channel, an identification of the channel (e.g., N octets, where N is the number of supported/allowed channels). Alternatively, any other manner of identifying support may be utilized. Furthermore, the identification of channel support may be separated in multiple elements included in multiple messages. In some implementations, as illustrated in FIG. 9, an indication of an operating mode to be utilized for interpreting the operating channel field is included in the field. For example, an operating mode element may indicate whether the channels indicating in the operating channels field should limit the channels used for all communications within the network 100 (e.g., communications between a STA and the AP 102 and communications among STAs) or should only limit channels used for communications with the AP 102 (e.g., communications between a STA and the AP 102). While example fields and field locations are illustrated in FIGS. 7 and 8, any other field structure and location may be utilized to announce the channels supported/allowed within the infrastructure of the example network 100.

The example operating channel field inserter 306 inserts the operating channel field generated by the example operating channel field generator 304 into a message. According to the illustrated example, as illustrated in FIGS. 8 and 9, the operating channel field inserter 306 inserts the operating channel field into an EDMG Operation element transmitted by the AP 102. While an example location for the operating channel field in the EDMG Operation element is illustrated in FIGS. 8 and 9, the operating channel field may be inserted in any other location within the EDMG operation element or another message. The EDMG Operation element may be transmitted in a directional multi-gigabit (DMG) beacon, a probe request/response, etc., so that the STA in the example network 100 obtain knowledge of the operating channels supported/allowed by the infrastructure.

While an example manner of implementing the operating channels element generator 104 of FIG. 1 is illustrated in FIG. 3, one or more of the elements, processes and/or devices illustrated in FIG. 3 may be combined, divided, re-arranged, omitted, eliminated and/or implemented in any other way. Further, the example allowed channels identifier 302, the example operating channel field generator 304, the operating channel field inserter 306, and/or, more generally, the example operating channels element generator 104 of FIG. 3 may be implemented by hardware, software, firmware and/or any combination of hardware, software and/or firmware. Thus, for example, any of the example allowed channels identifier 302, the example operating channel field generator 304, the operating channel field inserter 306, and/or, more generally, the example operating channels element generator 104 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, allowed channels identifier 302, the example operating channel field generator 304, and/or the operating channel field inserter 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example the operating channels element generator 104 of FIG. 1 may include one or more elements, processes and/or devices in addition to, or instead of, those illustrated in FIG. 3, and/or may include more than one of any or all of the illustrated elements, processes and devices.

Flowcharts representative of example machine readable instructions for implementing the station channel capabilities handler 108 of FIGS. 1 and/or 2 is shown in FIGS. 4-5. In the examples, the machine readable instructions comprise program(s) for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 4, many other methods of implementing the example station channel capabilities handler 108 may alternatively be used. For example, the order of execution of the blocks may be changed, and/or some of the blocks described may be changed, eliminated, or combined.

As mentioned above, the example process of FIGS. 4-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 400 of FIG. 4 begins at block 402 when the example channel support identifier 202 determines channels supported by an STA (e.g., the example STA A 106 and/or the example STA B 110 of FIG. 1). The example channel capability field generator 204 generates a channel capabilities field identifying the supported channels (block 404). The example channel capabilities field inserter 206 inserts the channel capabilities field into a capabilities element (e.g., an EDMG capabilities element as illustrated in FIG. 7) (block 406). The process of FIG. 4 then terminates.

The process 500 of FIG. 5 begins at block 502 when the example channel controller 210 determines channels supported by the STA on which the process 500 is executing (e.g., STA A 106). The example channel capabilities receiver 208 then determines channel support/allowance indicated by the example AP 102 (block 504). For example, the channel support/allowance of the infrastructure of the network 100 may be indicated by the AP 102 in an EDMG Operation element. The example channel capabilities receiver 208 then determines channel capabilities supported by an endpoint for a communication (e.g., STA B 110) (block 506). For example, the example channel capabilities receiver 208 may receive an indication of the channel support of STA B 110 in an EDMG Capabilities element generated in accordance with the methods and apparatus disclosed herein.

The example channel controller 210 then selects a channel(s) for use in the communication based on the capabilities of the STA, the infrastructure, and the communication endpoint (block 508). For example, the example channel controller 210 may select channels that are mutually supported by the STA, the infrastructure, and the communication endpoint. In some examples in which the AP 102 indicates an operating mode for channel support/allowance indicated for the infrastructure, the channel controller 210 may select a channel(s) that is not indicated to be supported by the infrastructure. For example, if STA A 106 is attempting to communicate with STA B 110 and the operating mode indicated in an EDMG Operation element indicates that the STA may utilize a channel not supported by the infrastructure when communicating with another STA, the channel controller 210 may ignore the support/allowance indicated by the AP 102 and utilize channel(s) mutually supported by the STA A 106 and the STA B 110.

Figure 6:
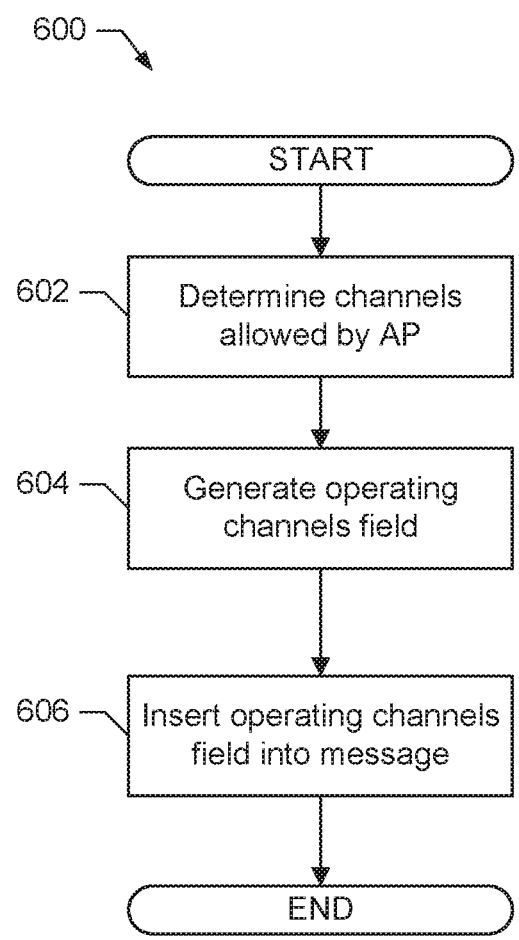
FIG. 6 is a flowchart illustrating example machine readable instructions that may be executed to implement the operating channels element generator of FIGS. 1 and/or 3.

A flowcharts representative of example machine readable instructions for implementing the operating channels element generator 104 of FIGS. 1 and/or 3 is shown in FIG. 6. In the example, the machine readable instructions comprise program(s) for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 6, many other methods of implementing the example operating channels element generator 104 may alternatively be used. For example, the order of execution of the blocks may be changed, and/or some of the blocks described may be changed, eliminated, or combined.

As mentioned above, the example process of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). Additionally or alternatively, the example process of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

The process 600 of FIG. 6 begins at block 602 when the example allowed channels identifier 302 determines channels allowed for the infrastructure of example network 100. For example, the allowed channels identifier 302 may retrieve a listing of allowed channels from a memory of the example AP 102. The example operating channel field generator 304 generates an operating channels field identifying the channels supported/allowed (block 604). The example operating channel field inserter 306 inserts the operating channels field into an operation element (e.g., an EDMG Operation element) for transmission to the devices in the network 100 (e.g., the example STA A 106 and the example STA B 110) (block 606). The process of FIG. 6 then terminates.

FIG. 7 illustrates an example EDMG Capabilities element that has been modified to include a channel capabilities field (identified as "Supported EDMG Channels" in the example) generated by the example channel capabilities field generator 204 of the example station channel capabilities handler 108 of FIG. 1. According to the illustrated example, the field includes an element (e.g., 1 octet) indicating the number of channels supported and, for each supported channel, an identification of the channel (e.g., N octets, where N is the number of supported channels).

FIG. 8 illustrates an example EDMG operation element that has been modified to include an operating channels field (identified as "Operating EDMG Channels" in the example) generated by the example operating channel field generator 304 of the example operating channels element generator 104 of FIG. 1. According to the illustrated example, the field includes an element (e.g., 1 octet) indicating the number of channels supported and, for each supported channel, an identification of the channel (e.g., N octets, where N is the number of supported channels).

FIG. 9 illustrates another example EDMG operation element that has been modified to include an operating channels field (identified as "Operating EDMG Channels" in the example) generated by the example operating channel field generator 304 of the example operating channels element generator 104 of FIG. 1. According to the illustrated example, the field includes an element (e.g., 1 octet) indicating the number of channels supported (e.g., allowed in the BSS) and, for each supported channel, an identification of the channel (e.g., N octets, where N is the number of supported channels). The field illustrated in FIG. 9 additionally includes one octet for carrying an operating control field. The example operating control field includes 1 bit to indicate an operating mode and 7 bits that are reserved. According to the illustrated example, if the operating mode is a 1, the channels identified in the EDMG Operation element are to limit channel usage for all communications within the example network 100 (e.g., even communications among STAs). According to the illustrated example, if the operating mode is a 0, the channels identified in the EDMG operation element are to only limit channel usage for communications with the AP 102 (e.g., communications between an STA and the AP 102) and other communications may utilize channels not indicated to be supported (e.g., an STA may communicate with another STA using a channel that is not indicated as supported/allowed by the AP 102). While the example illustrated in FIG. 9 is an EDMG Operation element, a field with the same structure may be included in an EDMG Capabilities element or another element/message transmitted by a STA to indicate channels supported by the STA.

Figure 10:
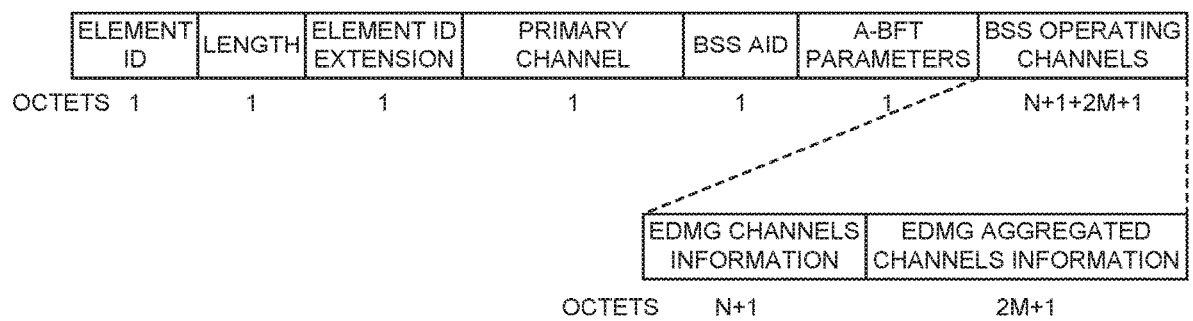

FIG. 10 illustrates another example EDMG operation element that has been modified to include an operating channels field (identified as "BSS Operating Channels" in the example) generated by the example operating channel field generator 304 of the example operating channels element generator 104 of FIG. 1. According to the illustrated example, the field includes N+1 octets for EDMG channel information (1 octet indicating the number of channels supported and N octets identifying supported channels) and 2M+1 octets for identifying EDMG aggregated channel information (e.g., 1 octet indicating the number, M, of channel aggregation combinations and 2M octets identifying the supported channel aggregations where each channel aggregation includes 1 octet to identifying the first channel of the aggregation and 1 octet to identify the second channel of the aggregation).

While example field order and field names are identified in the examples of FIGS. 7-10 and otherwise discussed herein, any other order and/or field name may be utilized in all of the example disclosed herein.

Figure 11:
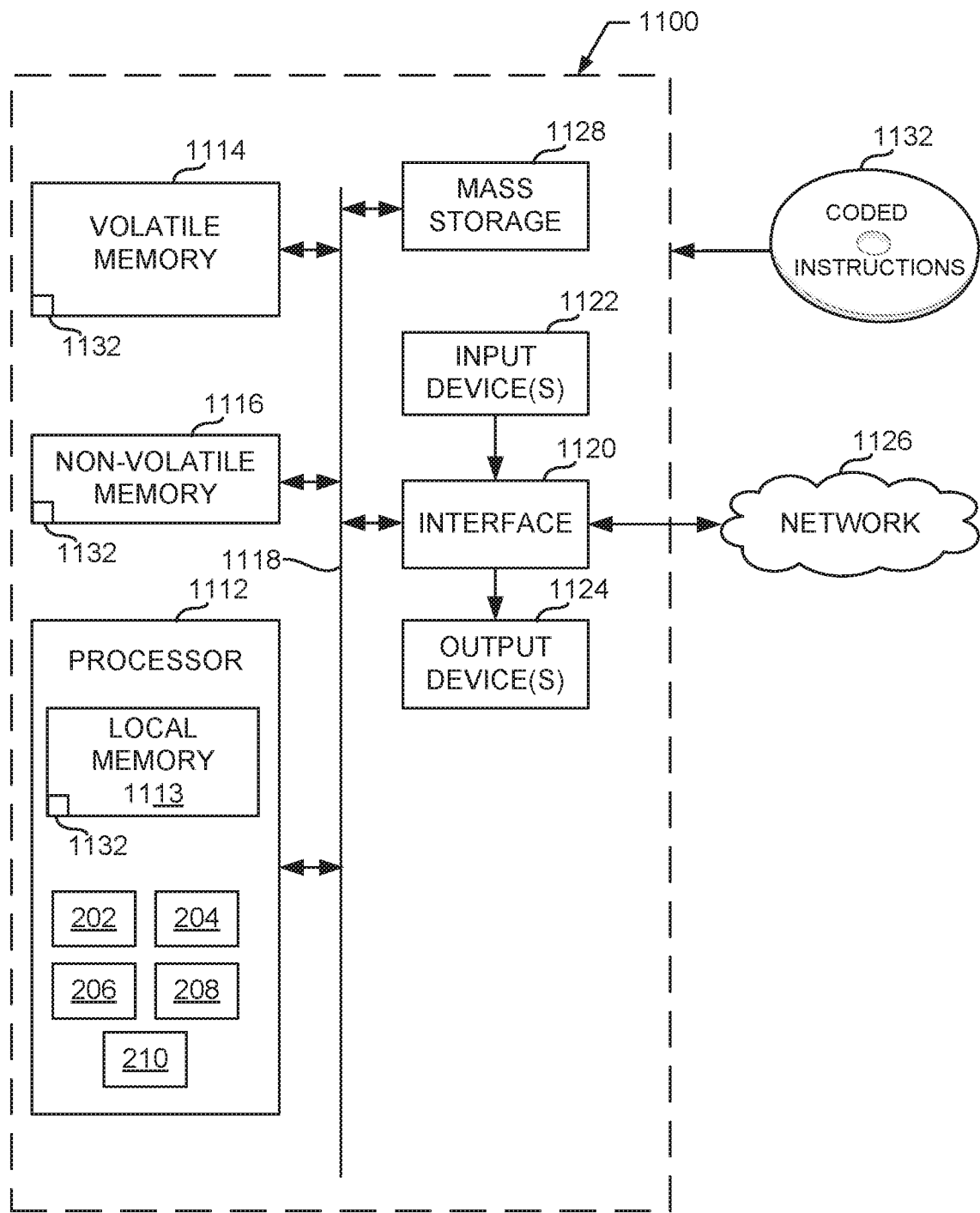
FIG. 11 is a block diagram of an example processor system that may execute the instructions of FIGS. 4-5 to implement the example station channel capabilities handler of FIGS. 1 and/or 2.

FIG. 11 is a block diagram of an example processor platform 1100 capable of executing the instructions of FIGS. 4-5 to implement the station channel capabilities handler 108 of FIGS. 1 and/or 2. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The example processor 1112 includes the example channel support identifier 202, the example channel capability field generator 204, the example channel capability field inserter 206, the example operating element analyzer 208, and the example channel controller 210.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 4-5 may be stored in the mass storage device 1128, in the volatile memory 1114, in the non-volatile memory 1116, and/or on a removable tangible computer readable storage medium such as a CD or DVD.

Figure 12:
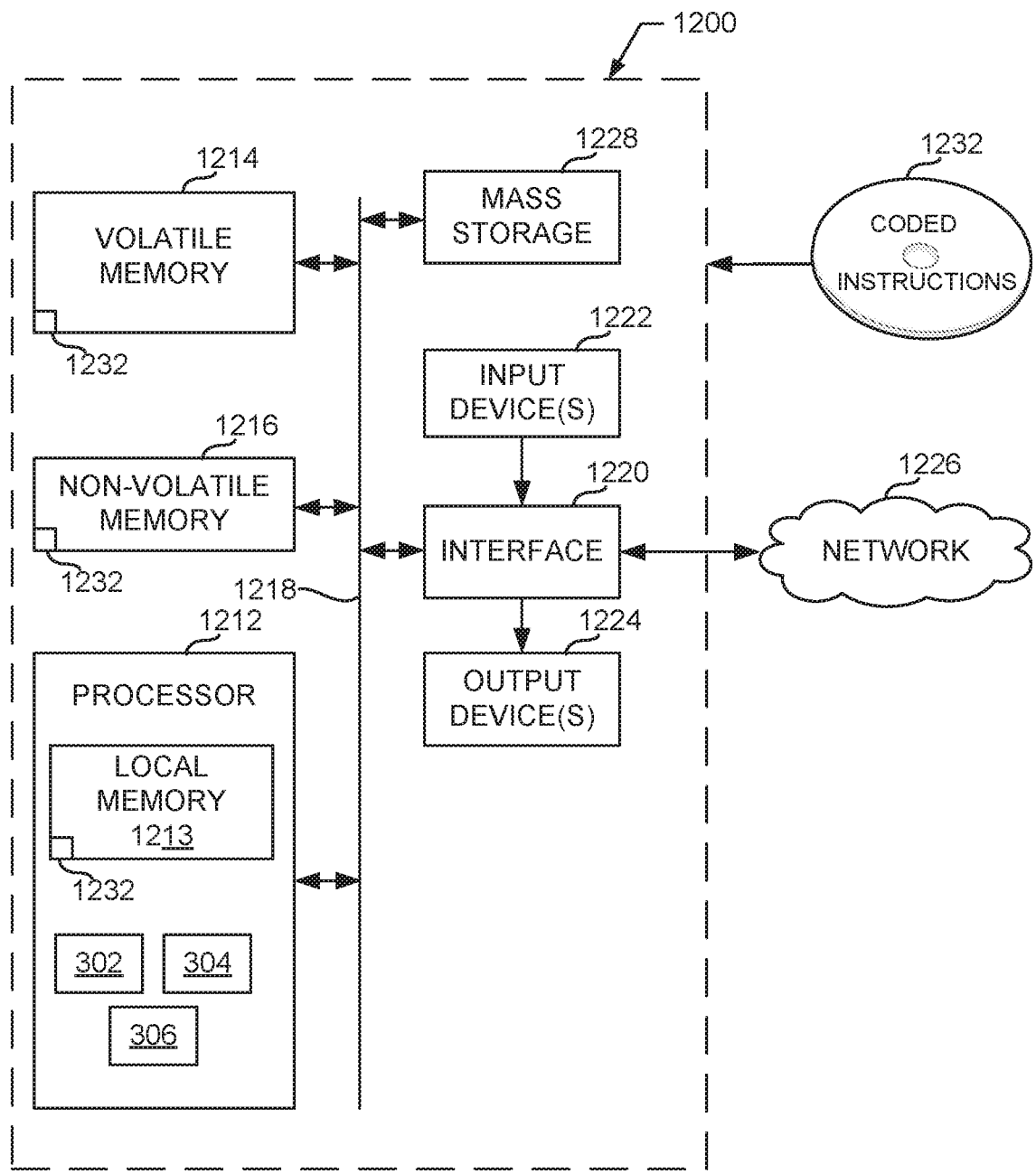
FIG. 12 is a block diagram of an example processor system that may execute the instructions of FIG. 6 to implement the example operating channels element generator of FIGS. 1 and/or 3.

FIG. 12 is a block diagram of an example processor platform 1200 capable of executing the instructions of FIG. 6 to implement the operating channels element generator 104 of FIGS. 1 and/or 3. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The example processor 1212 includes the example allowed channels identifier 302, the example operating channels field generator 304, and the example operating channel field inserter 306.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 4-5 may be stored in the mass storage device 1228, in the volatile memory 1214, in the non-volatile memory 1216, and/or on a removable tangible computer readable storage medium such as a CD or DVD.

Example methods, apparatus, systems and articles of manufacture to announce channel capabilities in wireless communication systems are disclosed herein. Further examples and combinations thereof include the following:

Example 1 is a first wireless communication device comprising: a channel support identifier to determine wireless communication channels supported by the first wireless communication device, a channel capability field generator to generate a listing of the supported wireless communication channels, and a channel capability field inserter to insert the listing into a Capabilities element transmitted to a second wireless communication device.

Example 2 includes the first wireless communication device as defined in example 1, wherein the wireless communication channels are millimeter wave wireless communication channels.

Example 3 includes the first wireless communication device as defined in example 1 or example 2, wherein the Capabilities element is an Extended Directional Multigigabit (EDMG) Capabilities element.

Example 4 includes the first wireless communication device as defined in example 1 or example 2, wherein the listing of the supported wireless communication channels includes a field identifying a number of supported wireless communication channels and fields identifying the supported wireless communication channels.

Example 5 includes the first wireless communication device as defined in example 1 or example 2, further including a channel capabilities receiver to receive a first indication of wireless communication channels supported by the second wireless communication device.

Example 6 includes the first wireless communication device as defined in example 5, wherein the first indication is sent in an EDMG Capabilities element.

Example 7 includes the first wireless communication device as defined in example 5, further including a channel controller to select a wireless communication channel for communication that is included in the listing and the first indication.

Example 8 includes the first wireless communication device as defined in example 7, wherein the channel capabilities receiver is further to receive a second indication of wireless communication channels supported by a network infrastructure.

Example 9 includes the first wireless communication device as defined in example 8, wherein the second indication is transmitted in an EDMG Operation element by a central device.

Example 10 includes the first wireless communication device as defined in example 8, wherein the channel controller is further to determine if the second indication includes an element indicating an operation mode, wherein the operation mode indicates whether the first wireless communication device is limited to using the wireless communication channels identified in the second indication when communicating with the second wireless communication device.

Example 11 is a method to announce channel capabilities in a wireless communication system, the method comprising: determining wireless communication channels supported by a first wireless communication device, generating a listing of the supported wireless communication channels, and inserting the listing into a Capabilities element transmitted to a second wireless communication device.

Example 12 includes the method as defined in example 11, wherein the wireless communication channels are millimeter wave wireless communication channels.

Example 13 includes the method as defined in example 11 or example 12, wherein the Capabilities element is an Extended Directional Multigigabit (EDMG) Capabilities element.

Example 14 includes the method as defined in example 11 or example 12, wherein the listing of the supported wireless communication channels includes a field identifying a number of supported wireless communication channels and fields identifying the supported wireless communication channels.

Example 15 includes the method as defined in example 11 or example 12, further including receiving a first indication of wireless communication channels supported by the second wireless communication device.

Example 16 includes the method as defined in example 15, wherein the first indication is sent in an EDMG Capabilities element.

Example 17 includes the method as defined in example 15, further including selecting a wireless communication channel for communication that is included in the listing and the first indication.

Example 18 includes the method as defined in example 15, further including receiving a second indication of wireless communication channels supported by a network infrastructure.

Example 19 includes the method as defined in example 18, wherein the second indication is transmitted in an EDMG Operation element by a central device.

Example 20 includes the method as defined in example 18, further including determining if the second indication includes an element indicating an operation mode, wherein the operation mode indicates whether the first wireless communication device is limited to using the wireless communication channels identified in the second indication when communicating with the second wireless communication device.

Example 21 is a tangible computer readable storage medium comprising instructions that, when executed, cause a first wireless communication device to: determine wireless communication channels supported by the first wireless communication device, generate a listing of the supported wireless communication channels, and insert the listing into a Capabilities element transmitted to a second wireless communication device.

Example 22 includes the tangible computer readable storage medium as defined in example 21, wherein the wireless communication channels are millimeter wave wireless communication channels.

Example 23 includes the tangible computer readable storage medium as defined in example 21 or example 22, wherein the Capabilities element is an Extended Directional Multigigabit (EDMG) Capabilities element.

Example 24 includes the tangible computer readable storage medium as defined in example 21 or example 22, wherein the listing of the supported wireless communication channels includes a field identifying a number of supported wireless communication channels and fields identifying the supported wireless communication channels.

Example 25 includes the tangible computer readable storage medium as defined in example 21 or example 22, wherein the instructions, when executed, cause the first wireless communication device to receive a first indication of wireless communication channels supported by the second wireless communication device.

Example 26 includes the tangible computer readable storage medium as defined in example 25, wherein the first indication is sent in an EDMG Capabilities element.

Example 27 includes the tangible computer readable storage medium as defined in example 25, wherein the instructions, when executed, cause the first wireless communication device to select a wireless communication channel for communication that is included in the listing and the first indication.

Example 28 includes the tangible computer readable storage medium as defined in example 25, wherein the instructions, when executed, cause the first wireless communication device to receive a second indication of wireless communication channels supported by a network infrastructure.

Example 29 includes the tangible computer readable storage medium as defined in example 28, wherein the second indication is transmitted in an EDMG Operation element by a central device.

Example 30 includes the tangible computer readable storage medium as defined in example 28, wherein the instructions, when executed, cause the first wireless communication device to determine if the second indication includes an element indicating an operation mode, wherein the operation mode indicates whether the first wireless communication device is limited to using the wireless communication channels identified in the second indication when communicating with the second wireless communication device.

Example 31 is a first wireless communication device comprising: means for determining wireless communication channels supported by the first wireless communication device, means for generating a listing of the supported wireless communication channels, and means for inserting the listing into a Capabilities element transmitted to a second wireless communication device.

Example 32 includes the first wireless communication device as defined in example 31, wherein the wireless communication channels are millimeter wave wireless communication channels.

Example 33 includes the first wireless communication device as defined in example 31 or example 32, wherein the Capabilities element is an Extended Directional Multigigabit (EDMG) Capabilities element.

Example 34 includes the first wireless communication device as defined in example 31 or example 32, wherein the listing of the supported wireless communication channels includes a field identifying a number of supported wireless communication channels and fields identifying the supported wireless communication channels.

Example 35 includes the first wireless communication device as defined in example 31 or example 32, further including means for receiving a first indication of wireless communication channels supported by the second wireless communication device.

Example 36 includes the first wireless communication device as defined in example 35, wherein the first indication is sent in an EDMG Capabilities element.

Example 37 includes the first wireless communication device as defined in example 35, further including means for selecting a wireless communication channel for communication that is included in the listing and the first indication.

Example 38 includes the first wireless communication device as defined in example 37, further including means for selecting a second indication of wireless communication channels supported by a network infrastructure.

Example 39 includes the first wireless communication device as defined in example 38, wherein the second indication is transmitted in an EDMG Operation element by a central device.

Example 40 includes the first wireless communication device as defined in example 38, further including means for if the second indication includes an element indicating an operation mode, wherein the operation mode indicates whether the first wireless communication device is limited to using the wireless communication channels identified in the second indication when communicating with the second wireless communication device.

Example 41 is a wireless communication system comprising: a central wireless communication device to: determine wireless communication channels supported by a wireless network infrastructure, generate a listing of the supported wireless communication channels, and insert the listing into an Operation element transmitted to a wireless communication device, and a first wireless communication device to: determine wireless communication channels supported by a first wireless communication device, generate a listing of the supported wireless communication channels, and insert the listing into a Capabilities element transmitted to a second wireless communication device, and a second wireless communication device to: receive the Operation element and the Capabilities element, and select a wireless communication channel for communication, the wireless communication channel included in the Capabilities element and the Operation element.

Example 42 includes the system as defined in example 41, wherein the wireless communication channels are millimeter wave wireless communication channels.

Example 43 includes the system as defined in example 41 or example 42, wherein the Capabilities element is an Extended Directional Multigigabit (EDMG) Capabilities element.

Example 44 includes the system as defined in example 41 or example 42, wherein the listing of the supported wireless communication channels includes a field identifying a number of supported wireless communication channels and fields identifying the supported wireless communication channels.

Example 49 includes the method as defined in example 41 or example 42, wherein the Operation element is transmitted in an EDMG Operation element by a central device.

Example 50 includes the method as defined in example 41 or example 42, wherein the second wireless communication device is further to determine if the Operation element includes an element indicating an operation mode, wherein the operation mode indicates whether the second wireless communication device is limited to using the wireless communication channels identified in the Operation element when communicating with the first wireless communication device.

Example 51 is a central wireless communication device comprising: an allowed channels identifier to determine wireless communication channels supported by a wireless network infrastructure, an operating channels field generator to generate a listing of the supported wireless communication channels, and an operating channels field inserter to insert the listing into an Operation element transmitted to a wireless communication device.

Example 52 includes the central wireless communication device as defined in example 51, wherein the central wireless communication device is an access point.

Example 53 includes the central wireless communication device as defined in example 51, wherein the Operation element is an Extended Directional Multigigabit (EDMG) Operation element.

Example 54 includes the central wireless communication device as defined in example 51, wherein the operating channels field generator is further to insert an element indicating an operation mode in the listing, wherein the operation mode indicates whether a first wireless communication device is limited to using the wireless communication channels identified in the listing when communicating with a second wireless communication device.

Example 55 includes the central wireless communication device as defined in example 51, wherein the listing indicates wireless communication channels that may be utilized by devices operating in the wireless network infrastructure.

Example 56 includes the central wireless communication device as defined in example 51, wherein the Operation element is transmitted in a communication according to the Institute of Electrical and Electronic Engineers (IEEE) 802.11 protocol.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first wireless communication device comprising:
a channel capabilities receiver to receive a first indication of first wireless communication channels supported by a second wireless communication device, the first indication including an operating mode element to indicate whether A) the first wireless communication device is limited to using the first wireless communication channels identified in the first indication when communicating with a third wireless communication device or B) the first wireless communication device may utilize wireless communication channels other than the first wireless communication channels when communicating with the third wireless communication device,
a memory to store a second indication of second wireless communication channels supported by the first wireless communication device;
a channel support identifier to determine ones of the second wireless communication channels supported by the first wireless communication device based on the first indication including the operating mode element and the second indication;
a channel capability field generator to generate a listing of the supported wireless communication channels;
a channel capability field inserter to insert the listing into an Extended Directional Multigigabit (EDMG) Capabilities element; and
a wireless transmitter to transmit the Capabilities element to the third wireless communication device.

2. The first wireless communication device as defined in claim 1, wherein the second wireless communication channels are millimeter wave wireless communication channels.

3. The first wireless communication device as defined in claim 1, wherein the listing of the supported wireless communication channels includes a first field identifying a number of supported wireless communication channels and second fields identifying the supported wireless communication channels.

4. The first wireless communication device as defined in claim 1, further including a channel capabilities receiver to receive a third indication of wireless communication channels supported by the third wireless communication device.

5. The first wireless communication device as defined in claim 4, wherein the first indication is sent in an EDMG Capabilities element.

6. The first wireless communication device as defined in claim 4, further including a channel controller to select a wireless communication channel for communication that is included in the listing and the first indication.

7. The first wireless communication device as defined in claim 6, wherein the first indication identifies wireless communication channels supported by a network infrastructure.

8. The first wireless communication device as defined in claim 7, wherein the first indication is transmitted in an EDMG Operation element by a central device.

9. A method to announce channel capabilities in a wireless communication system, the method comprising:
 receiving, by executing an instruction with a processor of a first wireless communication device, a first indication of first wireless communication channels supported by a second wireless communication device, the first indication including an operating mode element to indicate whether A) the first wireless communication device is limited to using the first wireless communication channels identified in the first indication when communicating with a third wireless communication device or B) the first wireless communication device may utilize wireless communication channels other than the first wireless communication channels when communicating with the third wireless communication device;
 determining, by executing an instruction with the processor, second wireless communication channels supported by the first wireless communication device;
 generating, by executing an instruction with the processor a listing of ones of the supported wireless communication channels based on the first indication including the operating mode element and the second wireless communication channels; and
 inserting, by executing an instruction with the processor, the listing into an Extended Directional Multigigabit (EDMG) Capabilities element transmitted to a second third wireless communication device.

10. The method as defined in claim 9, wherein the second wireless communication channels are millimeter wave wireless communication channels.

11. The method as defined in claim 9, wherein the listing of the supported wireless communication channels includes a first field identifying a number of supported wireless communication channels and second fields identifying the supported wireless communication channels.

12. The method as defined in claim 9, further including receiving a second indication of wireless communication channels supported by the second third wireless communication device.

13. The method as defined in claim 12, wherein the second indication is sent in an EDMG Capabilities element.

14. The method as defined in claim 12, further including selecting a wireless communication channel for communication that is included in the listing and the second indication.

15. The method as defined in claim 12, wherein the first indication identifies wireless communication channels supported by a network infrastructure.

16. The method as defined in claim 15, wherein the first indication is transmitted in an EDMG Operation element by a central device.

17. A tangible non-transitory computer readable storage medium comprising instructions that, when executed, cause a first wireless communication device to:
 receive a first indication of first wireless communication channels supported by a second wireless communication device, the first indication including an operating mode element to indicate whether A) the first wireless communication device is limited to using the first wireless communication channels identified in the first indication when communicating with a third wireless communication device or B) the first wireless communication device may utilize wireless communication channels other than the first wireless communication channels when communicating with the third wireless communication device;
 determine second wireless communication channels supported by the first wireless communication device;
 generate a listing of ones of the supported wireless communication channels based on the first indication including the operating mode element and the second wireless communication channels; and
 insert the listing into an Extended Directional Multigigabit (EDMG) Capabilities element transmitted to a second third wireless communication device.

18. The tangible non-transitory computer readable storage medium as defined in claim 17, wherein the second wireless communication channels are millimeter wave wireless communication channels.

19. The tangible non-transitory computer readable storage medium as defined in claim 17, wherein the listing of the supported wireless communication channels includes a first field identifying a number of supported wireless communication channels and second fields identifying the supported wireless communication channels.

20. The tangible non-transitory computer readable storage medium as defined in claim 17, wherein the instructions, when executed, cause the first wireless communication device to receive a second indication of wireless communication channels supported by the third wireless communication device.

* * * * *